(12) United States Patent     (10) Patent No.:   US 12,664,195 B1

Pathak et al.     (45) Date of Patent:    Jun. 23, 2026

(54) SYSTEMS AND METHODS FOR GENERATING USER-SPECIFIC OUTPUTS USING MODULAR AI AGENTS AND HYBRID DATA REPRESENTATION ENGINES

(71) Applicant: Go Daddy Operating Company, LLC, Tempe, AZ (US)

(72) Inventors: Harsh Nilesh Pathak, Bellevue, WA (US); Farnaz Tahmasebian, Bellevue, WA (US); Manish Kumar Agarwal, Gurugram (IN); Jing Xi, Tempe, AZ (US); Ramji Chandrasekaran, Kitchener (CA); Han Wang, Santa Clara (CA); Chaitanya Chhabra, Gurugram (IN); Vincent Yung, Tempe, AZ (US); Shivek Marwaha, Gurugram (IN); Bhajnik Singh Chadha, Ludhiana (IN); Yatin Thukral, Kanpur (IN)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 19/277,094

(22) Filed: Jul. 22, 2025

(51) Int. Cl.
    *G06F 17/30*     (2006.01)
    *G06F 16/335*     (2019.01)

(52) U.S. Cl.
    CPC .................................. *G06F 16/337* (2019.01)

(58) Field of Classification Search
    CPC ........ G06F 16/13; G06F 16/24; G06F 16/156; G06F 3/1297; G06N 3/00; G06N 5/00; G05B 13/00; H03M 7/30; H04N 9/8042; G06T 9/00
    See application file for complete search history.

(56) References Cited

U.S. PATENT DOCUMENTS

| | | | |
|---|---|---|---|
| 11,681,511 B2 * | 6/2023 | Arora .................... | G06F 9/5038 |
| | | | 717/123 |
| 12,327,118 B2 * | 6/2025 | Maturana ............ | G06F 18/2148 |
| 2018/0322419 A1 * | 11/2018 | Bugenhagen .......... | G06N 5/043 |
| 2021/0374575 A1 * | 12/2021 | Malabad ............ | G06Q 20/1085 |
| 2023/0214193 A1 * | 7/2023 | Makhija ........... | G06V 30/19113 |
| | | | 717/105 |
| 2024/0427915 A1 * | 12/2024 | Threadgill .............. | H04L 41/22 |

(Continued)

*Primary Examiner* — Hung D Le

(74) *Attorney, Agent, or Firm* — CHIP LAW GROUP

(57) ABSTRACT

The present disclosure relates to systems and methods for generating user-specific outputs using modular AI agents and hybrid data representation engines. At least one processor may receive user data inputs and task configuration data from multiple sources, where the task configuration data specifies a user-specific task. The processor may process the received data to generate raw input data and transmit it, along with the task configuration data, to a control plane configured to determine processing parameters for modular AI agents. The modular AI agents may include a feature selection agent to extract user interaction features, a numerical transformation agent to convert numerical values into text formats, and a summarization agent to generate a data representation with task-specific information. A hybrid data representation engine may generate user-specific outputs, which may be evaluated using a large language model, stored in a persistent storage layer, and provided via APIs to downstream systems.

20 Claims, 11 Drawing Sheets

(56) References Cited

U.S. PATENT DOCUMENTS

| 2025/0238707 | A1* | 7/2025 | Schuetz | ................. | G06N 20/00 |
| 2025/0259044 | A1* | 8/2025 | Crabtree | ................ | G06N 3/042 |
| 2025/0259085 | A1* | 8/2025 | Crabtree | .................. | G06N 5/01 |

* cited by examiner

*FIG. 2*

| Data 305 Sources | Data Processing 310 Methodology | Key Characteristics 315 | Technical 320 Highlights | Output 325 |
|---|---|---|---|---|
| Data lakes | Spark SQL querying | Behavioral pattern analysis | Anonymized data processing | Coherent, trend-aware cohort summaries |
| Search histories | Aggregation across user segments | Demographic attribute segmentation | Scalable aggregation techniques | Context-rich behavioral insights |
| Domain portfolios | Anonymized interaction data (e.g. 3-month rolling window) | Market-level trend identification | Dynamic feature extraction | Input for personalization workflows |
| Website content | No individual user tracking | Visitor-level insights generation | | |
| Retire API | | | | |
| Centralized aggregated data sources | | | | |

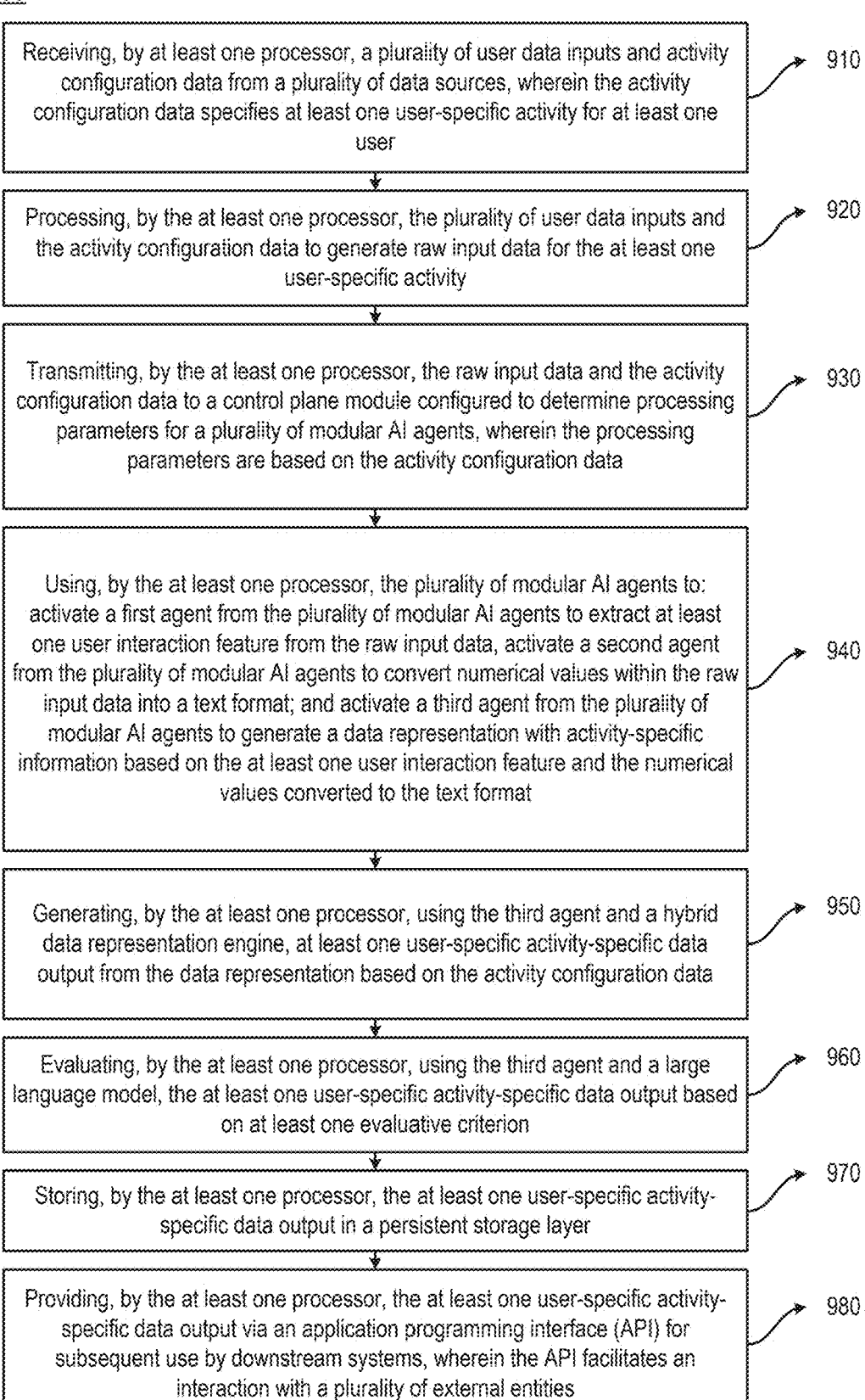

Receiving, by at least one processor, a plurality of user data inputs and activity configuration data from a plurality of data sources, wherein the activity configuration data specifies at least one user-specific activity for at least one user — 910

Processing, by the at least one processor, the plurality of user data inputs and the activity configuration data to generate raw input data for the at least one user-specific activity — 920

Transmitting, by the at least one processor, the raw input data and the activity configuration data to a control plane module configured to determine processing parameters for a plurality of modular AI agents, wherein the processing parameters are based on the activity configuration data — 930

Using, by the at least one processor, the plurality of modular AI agents to: activate a first agent from the plurality of modular AI agents to extract at least one user interaction feature from the raw input data, activate a second agent from the plurality of modular AI agents to convert numerical values within the raw input data into a text format; and activate a third agent from the plurality of modular AI agents to generate a data representation with activity-specific information based on the at least one user interaction feature and the numerical values converted to the text format — 940

Generating, by the at least one processor, using the third agent and a hybrid data representation engine, at least one user-specific activity-specific data output from the data representation based on the activity configuration data — 950

Evaluating, by the at least one processor, using the third agent and a large language model, the at least one user-specific activity-specific data output based on at least one evaluative criterion — 960

Storing, by the at least one processor, the at least one user-specific activity-specific data output in a persistent storage layer — 970

Providing, by the at least one processor, the at least one user-specific activity-specific data output via an application programming interface (API) for subsequent use by downstream systems, wherein the API facilitates an interaction with a plurality of external entities — 980

*FIG. 10*

SYSTEMS AND METHODS FOR GENERATING USER-SPECIFIC OUTPUTS USING MODULAR AI AGENTS AND HYBRID DATA REPRESENTATION ENGINES

FIELD OF DISCLOSURE

The present disclosure generally relates to computer-based systems, and specifically to systems and methods for generating user-specific outputs using modular artificial intelligence (AI) agents and hybrid data representation engines.

BACKGROUND

The growing integration of digital channels, accompanied by the diversified influx of data from sources such as user behavioral logs, transaction histories, and interaction feedback, has generated a significant demand for systems capable of delivering finely tailored experiences. Conventional personalization approaches, while benefitting from advancements in data analytics and machine learning, often face challenges in extracting nuanced insights from heterogeneous datasets. Additionally, traditional mechanisms tend to rely on broad segmentation, which may fail to account for the detailed behavioral patterns necessary to ensure that recommendations and content are both timely and contextually appropriate.

Thus, there is a need in the art for systems and methods that can dynamically process large-scale data inputs, extract relevant features, transform data into human-readable formats, and generate personalized summaries tailored to specific tasks. Such systems should be modular, scalable, and capable of integrating seamlessly with downstream applications to deliver real-time, context-aware outputs.

SUMMARY

In some embodiments, the present disclosure provides an exemplary technically improved computer-based method that includes at least the following steps of receiving, by at least one processor, a plurality of user data inputs and activity configuration data from a plurality of data sources, where the activity configuration data specifies at least one user-specific activity for at least one user. The method may further include processing, by the at least one processor, the plurality of user data inputs and the activity configuration data to generate raw input data for the at least one user-specific activity. The method may include transmitting, by the at least one processor, the raw input data and the activity configuration data to a control plane module configured to determine processing parameters for a plurality of modular AI agents, where the processing parameters are based on the activity configuration data. The method may include using, by the at least one processor, the plurality of modular AI agents to activate a first agent from the plurality of modular AI agents to extract at least one user interaction feature from the raw input data, activate a second agent from the plurality of modular AI agents to convert numerical values within the raw input data into a text format, and activate a third agent from the plurality of modular AI agents to generate a data representation with activity-specific information based on the at least one user interaction feature and the numerical values converted to the text format. The method may further include generating, by the at least one processor, using the third agent and a hybrid data representation engine, at least one user-specific activity-specific data output from the data representation based on the activity configuration data.

In some embodiments, the present disclosure provides an exemplary technically improved computer-based system that includes at least the following components at least one processor and a memory coupled to the at least one processor, the memory storing instructions that, when executed by the at least one processor, cause the system to receive a plurality of user data inputs and activity configuration data from a plurality of data sources, where the activity configuration data specifies at least one user-specific activity for at least one user. The system may process the plurality of user data inputs and the activity configuration data to generate raw input data for the at least one user-specific activity, transmit the raw input data and the activity configuration data to a control plane module configured to determine processing parameters for a plurality of modular AI agents, where the processing parameters are based on the activity configuration data, and use the plurality of modular AI agents to activate a first agent from the plurality of modular AI agents to extract at least one user interaction feature from the raw input data, activate a second agent from the plurality of modular AI agents to convert numerical values within the raw input data into a text format, and activate a third agent from the plurality of modular AI agents to generate a data representation with activity-specific information based on the at least one user interaction feature and the numerical values converted to the text format. The system may generate, using the third agent and a hybrid data representation engine, at least one user-specific activity-specific data output from the data representation based on the activity configuration data, evaluate, using the third agent and a large language model, the at least one user-specific activity-specific data output based on at least one evaluative criterion, store the at least one user-specific activity-specific data output in a persistent storage layer, and provide the at least one user-specific activity-specific data output via an application programming interface (API) for subsequent use by downstream systems, where the API facilitates an interaction with a plurality of external entities.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 is a table illustrating the data sources, processing methodologies, and outputs in accordance with one or more embodiments of the present disclosure;

FIG. 10 is a flowchart of a method for generating user-specific outputs using modular AI agents and hybrid data representation engines in accordance with one or more embodiments of the present disclosure.

DETAILED DESCRIPTION

Figure 1:
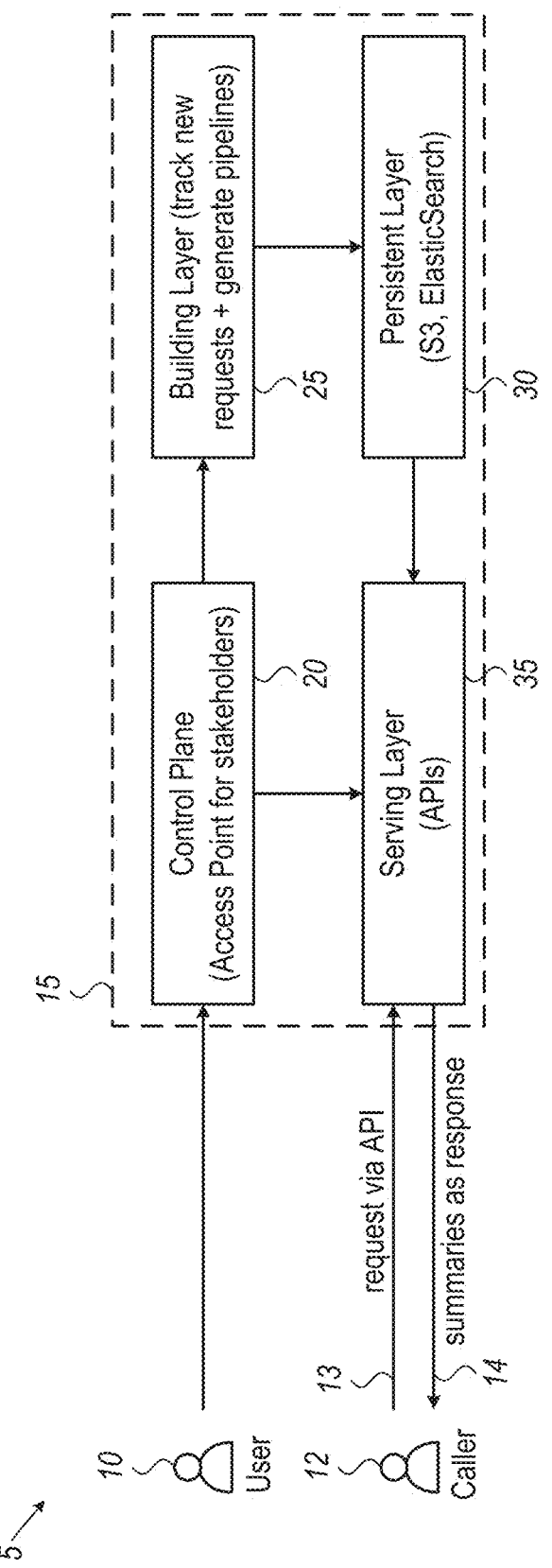
FIG. 1 is a diagram illustrating the modular architecture of a Personalized Agentic AI Service (PAAIS) system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "In at least some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

At least some embodiments of the present disclosure may enable a system to dynamically process user data inputs and task configuration data from multiple sources to perform personalized tasks for individual users or cohorts. The task configuration data may define specific personalization objectives, such as user preferences, cohort definitions, and/or task-specific constraints. By processing the received data, the system may generate raw input data that serves as the foundation for further analysis and personalization. This raw input data may then be transmitted to a control plane, which may orchestrate the processing pipeline by determining parameters for modular AI agents based on the task configuration data.

In at least some embodiments, the system may invoke a plurality of modular AI agents to perform specialized tasks within the personalization pipeline. These modular AI agents may include a feature selection agent, which may extract relevant user interaction features from the raw input data, such as clickstream data, search history, and/or purchase behavior. A numerical transformation agent may convert numerical values, such as timestamps or transaction amounts, into human-readable formats to enhance interpretability. Additionally, a summarization agent may generate intermediate data representations that encapsulate task-aware insights derived from the extracted features and transformed numerical data.

At least some embodiments of the present disclosure may incorporate a hybrid summarization engine that combines extractive and abstractive summarization techniques to generate personalized summaries tailored to the task configuration data. Extractive summarization may identify key phrases and sentences from the intermediate data representation, while abstractive summarization may rephrase and generate new text to enhance contextual relevance. By leveraging this hybrid approach, the system may produce comprehensive summaries that are both concise and contextually aligned with the personalization task.

In at least some embodiments, the system may evaluate the generated personalized summaries using a large language model configured as a judge. This evaluation process may assess the summaries based on criteria such as contextual relevance, factual accuracy, and/or alignment with the personalization task. Once evaluated, the personalized summaries may be stored in a persistent storage layer for future use and retrieval. The system may then provide these summaries via an application programming interface (API), enabling seamless integration with downstream systems and real-time consumption of personalized outputs.

The growing demand for personalized digital experiences has revealed significant limitations in conventional AI-driven personalization systems. Traditional approaches may rely on cohort-based segmentation, which may aggregate users into broad groups based on general behavioral patterns. While these methods may provide high-level insights, they may fail to capture the nuanced, task-specific attributes required for delivering individualized recommendations. Moreover, existing systems may lack modularity and adaptability, creating challenges in integrating diverse data sources or dynamically adjusting workflows based on real-time user interactions. State-of-the-art language models may excel at generating contextual responses but may not incorporate historical user data or structured task-aware processing, which may limit their utility for long-term, behavior-driven personalization.

At least some embodiments of the present disclosure may address these challenges by introducing a modular, agent-based AI framework designed to unify and optimize personalization workflows at scale. The system may dynamically process user data inputs and task configuration data from multiple sources to perform task-aware personalization for individual users or cohorts. By leveraging specialized modular AI agents, such as feature selection, numerical transformation, and summarization agents, the system may extract relevant user interaction features, may convert numerical data into human-readable formats, and/or may generate intermediate data representations tailored to specific tasks. A hybrid summarization engine, which may combine extractive and abstractive techniques, may further refine these representations into personalized summaries that are both concise and contextually relevant. These summaries may be evaluated using large language models configured as judges, ensuring alignment with task-specific criteria such as contextual relevance, factual accuracy, and personalization objectives.

In at least some embodiments, the modular architecture of the system may facilitate seamless scalability and adaptability, enabling the integration of new AI agents or processing layers without disrupting existing workflows. The control plane may manage the processing pipeline by dynamically determining parameters for modular AI agents based on task configuration data, ensuring effective performance. Furthermore, the system may include robust storage and serving layers to store evaluated summaries and may provide them via APIs for real-time use by downstream systems. This innovative approach may address the challenges of cohort-based personalization while improving the efficiency, precision, and scalability of AI-driven workflows, establishing the system as a valuable resource for delivering adaptive, task-aware insights across diverse applications.

In at least some embodiments, the system may leverage a range of technologies and platforms, that may include but are not limited to OpenSearch from AWS for search and indexing, S3 AWS Storage Layer for persistent data storage, CaaS (Content as a Service) for batch LLM access, Katana API Serving Layer for delivering outputs, FastAPI for API management, and various AWS services such as ECS Fargate, EMR, MWAA, Secrets Manager, and CloudWatch for orchestration, workflow management, security, and monitoring.

FIG. 1 is a diagram illustrating the modular architecture of a Personalized Agentic AI Service (PAAIS) system 5 in accordance with one or more embodiments of the present disclosure. The PAAIS system 5 may include multiple layers and components that may work together to process user data inputs, generate personalized outputs, and deliver them to downstream systems.

In at least some embodiments, a User 10 may interact with the PAAIS system 5 by providing data inputs or requesting specific outputs. A Caller 12 may represent an external entity or application that may send requests to the PAAIS system 5 via an API.

In at least some embodiments, a Control Plane 20 may act as the central access point for stakeholders, orchestrating the flow of data and determining processing parameters for modular AI agents. The Control Plane may dynamically adjust these parameters based on the task configuration data provided by the user or caller.

In at least some embodiments, a Building Layer 25 may track new requests and may generate pipelines for processing the received data. This layer may invoke modular AI agents to perform specialized tasks, such as feature extraction, numerical transformation, and summarization.

In at least some embodiments, a Persistent Layer 30 may provide a robust storage solution for processed data and metadata. This layer may use technologies such as S3 and ElasticSearch, for example, to ensure scalability, reliability, and/or efficient retrieval of stored outputs.

In at least some embodiments, a Serving Layer 35 may act as the interface between the PAAIS system 5 and downstream systems. It may deliver personalized outputs via APIs, enabling seamless integration with external applications.

In at least some embodiments, a Request via API 13 may represent the mechanism through which the caller may send data or task configuration requests to the PAAIS system 5. A Summaries as Response 14 may represent the personalized outputs generated by the system and returned to the caller.

Figure 2:
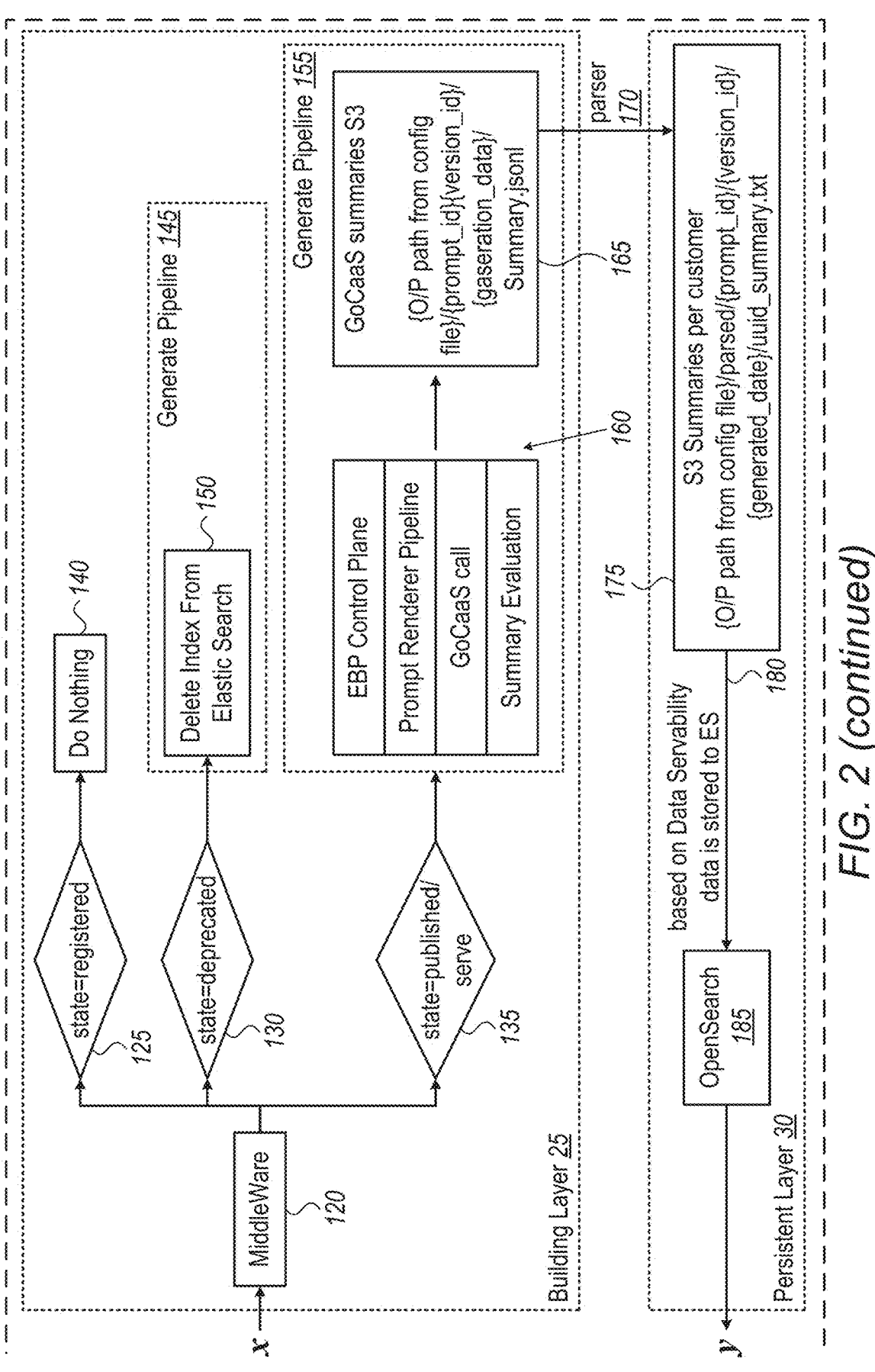
FIG. 2 is a diagram illustrating the detailed data flow within the PAAIS system in accordance with one or more embodiments of the present disclosure.

FIG. 2 is a diagram illustrating the detailed data flow within the PAAIS system in accordance with one or more embodiments of the present disclosure. The diagram may depict how user data inputs and task configuration data may flow through various layers and components to generate personalized outputs tailored to specific tasks. The iterative nature of the process may ensure continuous refinement and optimization of the generated outputs.

In at least some embodiments, a User Creates 55 may represent the initial step where the user may define task configurations or provide data inputs. This step may involve specifying the user-specific task, operational constraints, or preferences that guide the system's processing pipeline.

In at least some embodiments, a Creates PR 60 may represent the creation of processing requests (PR) that may trigger subsequent workflows. These requests may include metadata, task-specific parameters, and input data schemas that are essential for initiating the processing pipeline.

In at least some embodiments, a Fire Events 70 may represent the activation of specific processes or workflows within the PAAIS system 5. These events may be triggered by the processing requests and may initiate the execution of modular AI agents and other system components.

In at least some embodiments, a Job Manager 90 may coordinate the execution of tasks and workflows. The Job Manager may ensure that tasks are executed in the correct sequence and may monitor their progress to address any issues that arise during processing.

In at least some embodiments, an API Gateway 95 may act as the entry point for external requests, validating and routing them to the appropriate components within the PAAIS system 5. The API Gateway may ensure secure and efficient communication between external entities and the PAAIS system 5.

In at least some embodiments, a Prompt Life Cycle Management 105 may manage the lifecycle of prompts, ensuring that they are processed, updated, and/or stored as needed. This component may handle the creation, modification, and deletion of prompts based on user requirements and system feedback.

In at least some embodiments, an Execution Management 110 may oversee the execution of tasks, ensuring that they adhere to predefined rules and constraints. Execution Management may dynamically adjust workflows based on real-time feedback to optimize system performance.

In at least some embodiments, a Multiflow 120 may represent the branching workflows that may handle different types of data inputs and processing requirements. The Multiflow 120 may enable parallel processing of tasks, ensuring scalability and efficiency.

In at least some embodiments, State=Registered 125, State=Deprecated 130, and State=Published/Serve 135 may represent the various states of data or prompts within the PAAIS system 5. These states may determine how data is processed, stored, or served to downstream systems.

In at least some embodiments, a Do Nothing 140 and Delete Index from Elastic Search 150 may represent specific actions that may be taken based on the state of the data. These actions may ensure that outdated or irrelevant data is appropriately handled.

In at least some embodiments, an EBP Control Plane 160 may manage the overall orchestration of workflows and data processing. The Control Plane may dynamically adjust parameters for modular AI agents and other system components based on task configuration data.

In at least some embodiments, a Based on Data Servability/Data is Stored in ES 180 may represent the decision-making process for storing data in ElasticSearch. This component may ensure that data is indexed and stored efficiently for future retrieval.

In at least some embodiments, a Consumer 85 may represent external systems or applications that may consume the outputs generated by the PAAIS system 5. Consumers may interact with the PAAIS system 5 via APIs to retrieve user-specific task-specific data outputs.

In at least some embodiments, a Fetch the Summaries 190 may represent the retrieval of processed outputs from storage. This component may ensure that the outputs are delivered to downstream systems in a timely and efficient manner.

In at least some embodiments, a HiveMind 205 may represent the component that may manage the integration of outputs with downstream systems. The HiveMind 205 may ensure that the outputs are compatible with external systems and meet their specific requirements.

In at least some embodiments, a Repo 65 and GitHub Actions 75 may represent the tools and workflows used for managing code and configurations within the PAAIS system 5. These components may ensure that the system's software routines are up-to-date and optimized for performance.

In at least some embodiments, a Tracks New Request 80 may represent the mechanism for monitoring and handling new requests. This component may ensure that incoming requests are appropriately prioritized and processed.

In at least some embodiments, a Validate+Route 100 may represent the validation and routing of incoming requests. This component may ensure that requests are directed to the appropriate system components for processing.

In at least some embodiments, a Generate Pipeline 145, 155 may represent the creation of processing pipelines for handling specific tasks. These pipelines may define the sequence of operations required to generate user-specific task-specific data outputs.

In at least some embodiments, a Summaries S3 165 and a Parser 170 may represent the storage and parsing of processed outputs. These components may ensure that the outputs are organized and formatted for efficient retrieval and use.

In at least some embodiments, a S3 Summaries per Customer 175 may represent the organization of outputs based on customer-specific requirements. This component may ensure that outputs are tailored to individual users or cohorts.

that data is accessible and reliable for future use.

In at least some embodiments, an OpenSearch 185 and Data Servability 195 may represent the tools and processes used for indexing and retrieving stored data. These components may ensure that data is accessible and reliable for future use.

In at least some embodiments, a Call HM API for Which Versions to Serve 200 may represent the mechanism for determining which versions of outputs are provided to downstream systems. This component may ensure that the most relevant and up-to-date outputs are delivered.

Figure 3:
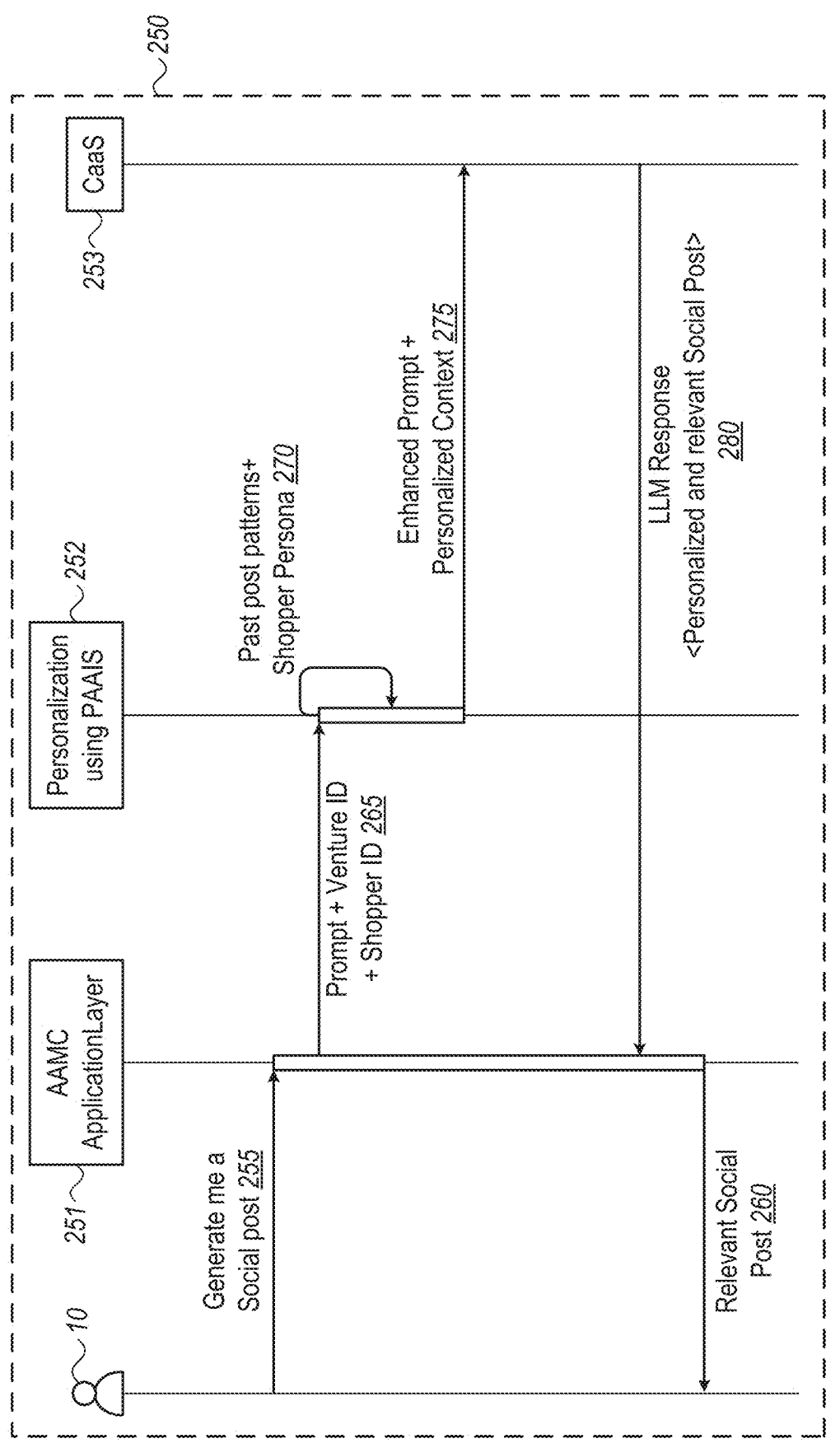
FIG. 3 is a diagram illustrating a hybrid summarization engine in accordance with one or more embodiments of the present disclosure.

FIG. 3 is a diagram illustrating a hybrid summarization engine in accordance with one or more embodiments of the present disclosure. The engine may combine extractive and abstractive techniques to generate personalized outputs tailored to task configuration data.

In at least some embodiments, a Generate me a Social Post 255 may represent the user request for generating a personalized social media post. A Relevant Social Post 260 may represent the output generated by the PAAIS system 5 in response to the request.

In at least some embodiments, a Prompt+Venture ID+Shopper ID 265 may represent the input data used to generate the social post. A Past Post Patterns+Shopper Persona 270 may represent the historical data and user profiles used to enhance the personalization of the output.

In at least some embodiments, an Enhanced Prompt+Personalized Context 275 may represent the refined input data that may be used to generate the final output. An LLM Response 280 may represent the output generated by the large language model.

In at least some embodiments, the User 10 may interact with the PAAIS system 5 to define the task configuration and provide input data. The AAMC Application Layer 251 may represent the application layer that may handle user requests and manage workflows.

In at least some embodiments, a Personalization using PAAIS 252 may represent the process of tailoring outputs to user-specific requirements. A CaaS 253 may represent a content-as-a-service layer that may deliver the final outputs to downstream systems.

In at least some embodiments, task-aware personalization may enable the PAAIS system 5 to tailor outputs to the specific objectives and requirements defined for each user or cohort. The PAAIS system 5 may receive task configuration data that explicitly describes the user's intended task, operational constraints, or preferences, which may guide the entire processing pipeline. By leveraging this configuration, the PAAIS system 5 may dynamically select and extract the most relevant user interaction features, ensuring that the resulting outputs are not only personalized but also directly aligned with the context and goals of the specified task.

In at least some embodiments, the PAAIS system 5 may employ an iterative approach to refine task-aware personalization, utilizing both offline evaluation and real-time feedback. Offline, the PAAIS system 5 may curate a golden dataset based on user preferences and task definitions, iterating on the generated outputs to optimize performance for each use case. For example, in the context of domain search, the PAAIS system 5 may analyze historical search data and language preferences to predict what a user is likely to purchase next, thereby enhancing the relevance and effectiveness of the recommendations. Real-time feedback, such as A/B testing metrics, may further inform the PAAIS system 5, allowing it to dynamically adjust personalization strategies and improve outcomes over time.

In at least some embodiments, large language models may be leveraged to generate and evaluate task-specific outputs, ensuring that the personalization process is both robust and contextually aware. The PAAIS system 5 may use advanced prompt engineering and summary templates to instruct the language model on the desired structure and content of the output, incorporating aggregated user data and transformed features. This approach may enable the generation of coherent, insightful, and actionable outputs that are specifically optimized for the user's current task, rather than relying solely on broad cohort-based segmentation or generic personalization techniques.

In at least some embodiments, the PAAIS system 5 may employ large language models (LLMs) to generate task-specific summaries through a structured, multi-step pipeline that leverages both their generative and evaluative capabilities. First, the PAAIS system 5 may utilize a summary template, which sets the optimized output format required by downstream AI applications. This template may ensure consistency and standardization, providing clear instructions to the LLM on the expected structure and style of the summary.

Second in at least some embodiments, the PAAIS system 5 may aggregate customer-specific data from various sources based on stakeholder requests, providing the factual basis that will be transformed and summarized.

Third, in at least some embodiments, numerical transformations may be applied to ensure that the data is human-readable and aligns with the template requirements. For example, numerical figures like "3" may be converted to "three," and "0.4" may be converted to "forty percent," making the data more suitable for natural language interpretation and integration into the summary.

Fourth, in at least some embodiments, with the enriched and human-readable data in place, the PAAIS system 5 may use a task-specific LLM to generate a personalized summary for each customer. The model may be prompted with both the transformed data and the summary template, leveraging its language understanding and generation capabilities to create a coherent, context-aware summary.

Fifth, in at least some embodiments, after the initial summary is generated, a second LLM—such as a state-of-the-art model—may be used to evaluate the quality of the personalized summary. This evaluation stage may serve as a quality assurance step, ensuring that the summary meets both stylistic and content-based benchmarks, and may provide feedback on aspects such as factual accuracy, completeness, and tone.

Sixth, in at least some embodiments, by integrating both generative and evaluative LLMs into the workflow, the PAAIS system 5 may ensure that the final outputs are not only contextually relevant and personalized but also meet high standards of quality and reliability before being delivered to downstream systems.

In at least some embodiments, the PAAIS system 5 may provide a scalable AI-powered personalization system that integrates and processes data from multiple sources to deliver customized content for LLM-driven applications. The data sources may include search history, which provides information on what each user has searched for and captures intent and interests; domain portfolio records, which reflect registered domains for each user and offer insights into their business scope and preferences; and published website content and metadata, which reveal current engagement and online presence. These various data tables may be stored in data lakes, and Spark SQL queries may be employed to fetch the targeted data as specified by the customer's requirements, ensuring that data extraction is both efficient and scalable for large volumes of records.

In at least some embodiments, the personalization aspect may involve using the aggregated data to generate personalized content such as tailored social posts, summaries, recommendations, or product insights. The PAAIS system 5 may leverage LLMs to transform raw data into outputs that match the unique profile of each user, including language style adaptation, context-aware content generation, and data-driven decision-making tailored specifically to individual user attributes and online behavior. By drawing from search history, domain portfolios, and published website data, the PAAIS system 5 may ensure that every output is not only data-rich but also finely tuned to the unique personality and needs of each user, providing a truly personalized experience for LLM-driven applications.

In at least some embodiments, the PAAIS system 5 may unify data-driven personalization by providing a centralized, modular framework that enables developers and product managers to orchestrate and automate the entire personalization workflow. The unifying aspect refers to the system's ability to bring together diverse data sources, modular AI tools, and configurable processing pipelines into a cohesive platform, eliminating the fragmentation and manual intervention often associated with traditional personalization approaches. By integrating feature selection, numerical transformation, and summarization agents within a single architecture, the PAAIS system 5 may streamline the extraction, transformation, and synthesis of user-specific data, making it accessible and actionable for a wide range of LLM-driven applications.

In at least some embodiments, the PAAIS system 5 may enable task-aware personalization beyond cohorts by supporting both individual and segment-level personalization, dynamically adjusting outputs based on real-time user interactions. Unlike traditional cohort-based models that aggregate users into broad groups, the PAAIS system 5 may identify relevant user interaction features for each specific task through its configurable processing pipeline. This may involve analyzing historical data, behavioral signals, and task configuration parameters to select the most significant attributes for the current personalization objective.

In at least some embodiments, by leveraging large language models, the PAAIS system 5 may generate task-specific outputs that are directly aligned with the user's intent and the requirements of the defined task. The system may use advanced prompt engineering and summary templates to instruct the LLM on the desired structure and content, incorporating aggregated user data and transformed features. This approach may ensure that the resulting outputs are not only highly personalized but also contextually relevant and optimized for the user's current needs, rather than relying solely on static, predefined cohorts.

In at least some embodiments, the PAAIS system 5 may implement an agentic AI architecture designed to facilitate seamless machine learning workflow automation. The architecture may be modular and scalable, enabling developers to leverage task-aware AI agents that dynamically invoke machine learning tools for feature selection, data transformation, and summarization. This approach may reduce manual intervention and allow for faster, automated data-to-personalization pipelines.

In at least some embodiments, the agentic AI architecture may not require the creation of new AI agents for each use case, but instead may empower developers to utilize existing task-aware summarization tools that dynamically invoke machine learning functionalities as needed. These tools may include feature selection agents that identify important user interaction features, numerical transformation agents that convert raw data into human-readable formats, and summarization agents that generate contextually relevant outputs.

In at least some embodiments, the modular design of the agentic AI architecture may allow for the integration of new AI agents or processing layers without disrupting existing workflows. The control plane may manage the orchestration of these agents, dynamically determining parameters based on task configuration data and real-time feedback. This architecture may streamline complex AI workflows, enabling developers and product managers to extract actionable insights with minimal manual effort and ensuring that the system remains adaptable and efficient as new personalization requirements emerge.

In at least some embodiments, the PAAIS system 5 may incorporate a hybrid summarization engine that combines extractive and abstractive summarization techniques to generate personalized outputs tailored to task configuration data. The hybrid summarization engine may enable the system to offer multiple summarization approaches—extractive, abstractive, and hybrid—as separate contextual options, providing users with the flexibility to choose the summary style that best fits their needs. Extractive summarization may identify and extract the most informative segments of data, such as key sentences or phrases, directly from the source data.

In at least some embodiments, the abstractive summarization component may rephrase and abstract the information into a new narrative, generating new wording that conveys the core information and enhances contextual relevance. The hybrid mode may leverage task-specific customization by tuning the large language model (LLM) with advanced prompt engineering, aligning the summary output with the specific objectives and context of the task at hand. This process may involve the use of summary templates that set the optimized output format required by downstream AI applications, ensuring consistency and scalability.

In at least some embodiments, the hybrid summarization engine may deliver several key advantages over traditional summarization techniques, including task-specific optimization, enhanced contextual relevance, and improved accuracy and flexibility. By incorporating both extractive and abstractive elements, the system may capture critical factual details while also generating nuanced insights. The advanced prompt engineering process may tune the LLM specifically for the task, enabling the generation of coherent, insightful, and actionable outputs that are optimized for the user's current needs and downstream application requirements.

Traditional summarization techniques may rely solely on either extractive or abstractive methods. Extractive summarization may simply identify and extract key sentences or phrases directly from the source data, often resulting in summaries that lack contextual adaptation and may not fully address the specific objectives of a given task. Abstractive summarization, as traditionally implemented, may generate new text to convey the core information, but may not be tuned to the unique requirements or context of each user-specific task, leading to outputs that are generic or misaligned with downstream application needs.

In contrast, in at least some embodiments, the hybrid summarization engine of the PAAIS system 5 may offer significant advantages by combining both extractive and abstractive techniques and enabling task-specific customization. The hybrid engine may allow users to select from extractive, abstractive, or hybrid summary styles as separate contextual options, providing flexibility to match the summary style to the requirements of the task. The hybrid mode may leverage advanced prompt engineering and summary templates to tune the large language model (LLM) specifically for the task at hand, ensuring that the generated output is not only consistent and scalable but also directly aligned with the objectives and context defined in the task configuration data.

In at least some embodiments, this approach may deliver key benefits over traditional methods, including task-specific optimization, enhanced contextual relevance, and improved accuracy and flexibility. By incorporating both extractive and abstractive elements, the hybrid summarization engine may capture critical factual details while also generating nuanced insights that are actionable and tailored to the user's current needs. The advanced prompt engineering process may further ensure that the LLM produces coherent, insightful, and contextually optimized outputs, making the PAAIS system 5 a powerful tool for delivering high-quality, personalized content for a wide range of downstream applications.

In at least some embodiments, the purchased_domain_portfolio_template may serve as an output template (format) provided to the LLM models so that the answers for many customers follow the same structure, thereby making the approach scalable and consistent for downstream applications. This level of standardization is not achieved in traditional summarization techniques. For example, by using the format from a customer's domain portfolio, the answer may be filled by the LLM model given the actual data of the customer. The template may include sections such as a portfolio overview, analytical summaries on domain styling—including one-word, two-word, and three-or-more-word domain names, invented domain names, and domain names with hyphens or numbers—as well as analytical summaries of second-level domains (SLDs) and top-level domains (TLDs). The template may further prompt the LLM to identify common SLD patterns, the longest and shortest SLDs, most frequent SLD lengths, top-k most recent purchased TLDs, common suffixes and prefixes for SLDs, most recent purchased SLDs, domain name length distribution, and a list of non-English domain names, concluding with an executive summary in 150 words or less. For reference, in a domain like apple.com, "apple" is the SLD and "com" is the TLD.

In at least some embodiments, the hybrid summarization engine may refer to the system's ability to offer multiple summarization approaches that are both task-aware and personalized. The engine may support extractive summarization, which identifies and extracts the most informative segments of data, as well as abstractive summarization, which rephrases and abstracts the information into a new narrative. The hybrid approach may combine both extractive and abstractive data, achieved through extensive evaluations of multiple prompt strategies and a specialized workflow that optimizes large language model (LLM) behavior according to the requirements of each task.

In at least some embodiments, the PAAIS system 5 may utilize advanced prompt engineering to guide the LLM in generating personalized summaries or contextual outputs. For example, a prompt may instruct the AI assistant to provide a concise summary of the data based on a given template, ensuring the summary is factual, insightful, and includes quantitative details where necessary. The prompt may require the use of a provided summary template, mandate the exclusion of sensitive identifiers such as shopper_id, and emphasize the importance of covering all key features and insights from the data. The LLM may process the prompt along with the machine learning or AI task, a list of important features, customer-specific JSON data, and the summary template to generate a personalized summary for each customer.

In at least some embodiments, the PAAIS system 5 may enhance structured data summarization beyond traditional extractive techniques by incorporating task-aware summarization, combining extractive, abstractive, and hybrid methods for more contextually relevant insights. The user may provide the specific task context along with the data, which may guide the tuning process for the LLM. The PAAIS system 5 may test and deploy a series of prompts designed to coax the LLM into producing summaries that are not only accurate but also optimized for the task at hand. The workflow may iteratively refine the generated output, ensuring that the summary conveys the necessary information in a format that meets the desired objectives. As a result, the generated summary may be highly targeted and practical for downstream applications, effectively addressing the limitations seen in general LLM outputs that lack task-specific tuning.

In at least some embodiments, the PAAIS system 5 may integrate with existing platforms and external systems by utilizing a centralized DataLake platform to retrieve use case information, along with its associated attributes and various events or signals. The system may utilize AWS services such as S3, EMR, and Managed Airflow to support data storage, processing, and workflow orchestration. Data from external systems—including platforms like Facebook, Instagram, Google Analytics, and others—may be ingested into the DataLake, where it is curated and organized into tables accessible by the PAAIS system 5. The system may access these curated tables and subsequently interact with LLM-based interfaces to generate personalized context, serving outputs via S3 and API endpoints.

In at least some embodiments, the PAAIS system 5 may provide a range of API endpoints to facilitate integration and support various functionalities. The main API endpoints may include:

1. /v1/personalised_summary/{use_case} (Method: POST), which may fetch personalized summaries for a specific use case. This endpoint may require an authorization token and an optional use-case-key header, take a DataRequest body with search criteria such as primary keys and version, and return a SummaryListResponse object with summaries matching the input conditions.

2. /v1/personalised_summary/{use_case}/sample (Method: GET), which may provide up to 5 sample summaries for a specific use case for testing or demonstration purposes, returning a SummaryListResponse object with up to 5 sample records.

3. /v1/usecases (to be renamed to/v1/pc_usecases) (Method: GET), which may list all available use cases supported by the system and return a sorted list of all use cases currently being supported.

4. /v1/discovery (to be renamed to/v1/prompt_templates/ discovery) (Method: GET), which may discover prompt templates and their details, such as record count and use cases being served, and return information about available prompt templates, versions, and record counts.

In at least some embodiments, the PAAIS system 5 may handle scalability, especially when dealing with large-scale personalization requests, by leveraging AWS Bedrock batch to generate personalized context in bulk. The generated contexts may be loaded to Opensearch serverless and served over API to the end user. The application may be deployed on ECS Fargate and may utilize AWS load balancer autoscaling features to scale horizontally based on the volume of API requests.

In at least some embodiments, the PAAIS system 5 may ensure high performance and low latency through several measures. Pre-generated summaries may be pre-computed and stored on S3, with metadata cached on Opensearch, ensuring high availability for large-scale requests. Asynchronous pipelines may be used so that tasks, such as ingestions and searches, may run in parallel using container-based or serverless platforms, providing on-demand scalability.

In at least some embodiments, elastic compute clusters may allow workloads to be automatically scaled up or down to accommodate millions of personalized profiles without degrading service. Caching and edge delivery may be implemented so that frequently accessed summaries are cached at the network edge, further reducing latency. Additionally, a combination of load balancers and fault-tolerant multi-region microservices may help the system handle traffic spikes smoothly, ensuring reliable and efficient delivery of personalized outputs.

In at least some embodiments, the PAAIS system 5 may employ a multi-layered security framework to protect user data and ensure compliance with GDPR, CCPA, and other privacy standards. At its core, robust authentication and authorization protocols may be implemented using IAM and Jomax-based JWT tokens, ensuring that only authenticated and authorized users may access data relevant to their specific use cases. In addition, Web Application Firewall (WAF) rules may be enforced at the load balancer level to allow only approved requests, thereby preventing any unauthorized communication with the PAAIS Serving API.

In at least some embodiments, data security may be further enhanced by encrypting information both in transit and at rest. All data exchanges may occur over HTTPS relying on TCP, which may safeguard against interception or tampering during transmission. Stored data may be similarly protected via encryption, ensuring that any physical or logical data breaches may have minimal impact.

In at least some embodiments, end users may access the data over API, and the API may only be accessed over VPN. The system may use AWS IAM-based authentication and authorization mechanisms, where IAM roles may need to be whitelisted based on the specific use case needs. Moreover, the application may be hosted on a private subnet with strict inbound and outbound rules defined. The data stored on S3 may be encrypted using KMS, and for transit, the system may use TLS 1.3.

In at least some embodiments, the system's infrastructure may be strictly hosted in the AWS us-west-2 region, which may help maintain regulatory compliance by adhering to regional data residency requirements. These stringent controls, combined with measures that may prevent unauthorized parties from modifying or deleting code repositories and negatively impacting the API service, may create a secure operational environment. This comprehensive security posture may be designed to protect user data while upholding the commitments required by GDPR, CCPA, and similar standards.

In at least some embodiments, the PAAIS system 5 may manage data privacy and user consent through a combination of rigorous security controls and strict adherence to data protection regulations. The system may enforce robust authentication and authorization methods, accepting only authorized users via IAM and Jomax-based JWT tokens. These measures may ensure that only the intended parties may access data relevant to their specific use-case, tags, or prompt IDs. The use of Web Application Firewall (WAF) rules at the load balancer may further restrict communications, blocking any unauthenticated or unauthorized attempts to interact with the PAAIS Serving API.

In at least some embodiments, data privacy may be reinforced by encrypting data both in transit and at rest. All communications may use HTTPS over TCP, safeguarding data against interception during transit, while encryption at rest may prevent unauthorized access to stored information. Moreover, the PAAIS system 5 may enforce strict hosting policies, operating only within the AWS us-west-2 region, which may help ensure compliance with regional data protection and privacy laws.

In at least some embodiments, the system's design may isolate PAAIS interactions from external influences by limiting the ability of third-party applications and external parties to negatively impact API services. These measures may collectively secure user data and ensure that explicit user consent governs data usage within clearly defined, compliant operational environments.

In at least some embodiments, the PAAIS system 5 may efficiently handle multiple requests for large-scale personalization by leveraging precomputed insights and pre-generated summaries, which may be stored in stages. This approach may ensure high availability and rapid response for large-scale requests while maintaining enterprise-grade security.

In at least some embodiments, the system may operate within a secure infrastructure, ensuring compliance with GDPR, CCPA, and stringent data privacy standards. The security team may have conducted and passed several security checks, including Security Architecture Review, Threat Model Review, Peer Code Review, Incident Response Planning, and Penetration Testing, to validate the robustness of the system's security and compliance measures.

In at least some embodiments, the PAAIS system 5 may generate higher-level cohort summaries by aggregating data across many users who share common behavioral or demographic attributes. The system may use data from various data tables in centralized data lakes, including search histories, domain portfolios, and website content. These datasets may be queried via Spark SQL, and the aggregated insights may be processed through task-aware pipelines to ensure that the resulting summaries are both relevant and actionable.

In at least some embodiments, the PAAIS system 5 may apply LLM-driven summarization to produce coherent, trend-aware summaries for each cohort. The system may analyze behavioral patterns across segmented user groups, identifying trends and commonalities that are significant at the cohort level. For market-level analysis, the system may source aggregated trend data from APIs and centralized data lakes, enabling the identification of broader market shifts and emerging patterns.

In at least some embodiments, visitor-level insights may be derived from anonymized interaction data collected over a rolling three-month period, which may enable trend analysis without relying on individual user tracking. To generate these summaries, the PAAIS system 5 may process input data—including the task description and feature schema—through a large language model. The system may identify high-value features and apply domain-specific guided prompts to produce context-rich summaries that capture relevant behavioral patterns.

In at least some embodiments, these cohort and market-level summaries may serve as input for downstream personalization workflows, enabling the system to deliver both individualized and segment-level recommendations. The approach may ensure that the PAAIS system 5 can address the needs of users, market analysts, and business stakeholders by providing insights that are both granular and scalable.

FIG. 4 is a table illustrating the data sources, processing methodologies, and outputs in accordance with one or more embodiments of the present disclosure. The table may provide a structured overview of how data is handled within the PAAIS system 5.

In at least some embodiments, a Data Sources 305 may include data lakes, search histories, domain portfolios, website content, and/or centralized aggregated data sources. These sources may provide the raw data inputs for the PAAIS system 5.

In at least some embodiments, a Data Processing Methodology 310 may include Spark SQL querying, aggregation across user segments, anonymized interaction data, and/or other techniques for processing raw data.

In at least some embodiments, Key Characteristics 315 may include behavioral pattern analysis, demographic attribute segmentation, market-level trend identification, and/or visitor-level insights generation.

In at least some embodiments, Technical Highlights 320 may include anonymized data processing, scalable aggregation techniques, and/or dynamic feature extraction.

In at least some embodiments, an Output 325 may include coherent, trend-aware cohort summaries, context-rich behavioral insights, and inputs for personalization workflows.

In at least some embodiments, the PAAIS system 5 may provide trend-aware recommendations by analyzing aggregated data across markets or regions to identify emerging trends, such as shifts in search behavior or domain acquisitions. The system may tailor recommendations at the market or regional level by extracting common patterns from historical data and dynamically adjusting content suggestions to reflect local interests and prevailing trends.

In at least some embodiments, trend-aware recommendations may be dynamically tailored based on the specific use case. For example, in the domain name generation use case, the PAAIS system 5 may provide trend-aware recommendations by analyzing patterns in Top-Level Domain (TLD) and Second-Level Domain (SLD) usage. This may include identifying popular prefixes, suffixes, and trend styles for generating SLDs and relevant naming conventions. These trends may help generate domain name suggestions that are aligned with current market demands and regional naming preferences.

In at least some embodiments, the PAAIS system 5 may support personalization by user granularity. For shopper-level personalization, when historical data such as search and purchase history is available, the system may generate individualized trends and contextual insights that are dynamically updated based on the user's ongoing activity. For visitor-level and market-level personalization, in the absence of individual tracking, the system may perform personalization using aggregated cohort trends. The system may monitor monthly trend shifts to detect consistent behavioral patterns, and these insights may inform broader content adaptation to ensure that recommendations remain relevant and effective across different user segments and regions.

In at least some embodiments, the PAAIS system 5 may be used to generate personalized content across multiple business domains, implemented as a modular, scalable service integrated across enterprise ecosystems via API-driven interaction. The primary use cases may include domain name generation, content optimization for social posts, and venture profile data generation. Key application areas may encompass social media content creation, domain name suggestions, website generation, and business insights generation.

In at least some embodiments, the core capabilities of the PAAIS system 5 may include personalized insights generation, trend-aware recommendations, and seamless integration with existing business workflows. These capabilities may enable strategic outcomes such as enhanced decision-making, improved user experiences, adaptive content generation, and data-driven personalization. The platform may provide a flexible, AI-powered solution that transforms content creation and business intelligence across different service lines.

In at least some embodiments, successful deployments of the PAAIS system 5 may have led to higher engagement metrics by presenting personalized website suggestions and targeted marketing content. Metrics such as increased conversion rates and improved customer retention may underscore the business impact of these tailored experiences.

In at least some embodiments, one notable usage of the PAAIS system 5 may be in domain name generation. Traditionally, separate models may have been required for Second-Level Domain (SLD) and Top-Level Domain (TLD) generation. In contrast, the PAAIS system 5 may consolidate these processes into a unified model that generates domain name candidates based on user intent and contextual signals.

In at least some embodiments, the PAAIS system 5 may generate domain names tailored to user intent, adapt to emerging naming trends such as popular TLDs and preferred suffix or prefix brand-style SLDs, and provide smarter, context-aware suggestions for shoppers and visitors alike. By focusing on visitor and market-level insights, the system may achieve measurable business improvements, such as a 26% increase in domain purchases and an 8% increase in gross conversion rate (GCR).

In at least some embodiments, this lift may be driven by customers receiving more relevant results and a better match for what they are searching for and what is trending in the market. By delivering more personalized context, the need for managing two separate models (one for SLD and another for TLD recommendation) may be eliminated, enabling more efficient handling of uncommon or niche TLDs and constraint-based domain name generation, such as length limits and brand consistency.

In at least some embodiments, the PAAIS system 5 may be actively enhanced with a series of strategic upgrades aimed at expanding its capabilities, improving performance, and enabling broader applicability across global markets and diverse use cases. Key areas of development may include multi-region deployment, where the deployment of the PAAIS system 5 across multiple geographical regions may enable more localized and latency improvements for users worldwide.

In at least some embodiments, global personalized context modeling may be supported, allowing the generation of personalized context by combining data from multiple sources. This feature may deliver pre-built or automatically generated personalized context that can be easily applied to various use cases, assisting new applications in quickly testing the platform by offering ready-to-use personalized context for customers, derived from their website, social media, online activity, and domain names.

In at least some embodiments, the platform may introduce multi-query, cohort-based refresh cycles, enabling dynamic cohort-refresh mechanisms that allow simultaneous multi-query updates. This may help maintain relevance across diverse user segments and customer profiles, ensuring that outputs remain current and effective.

In at least some embodiments, dynamic context composition may be enabled, allowing on-the-fly composition of multiple contextual inputs such as user intent, market trends, and behavioral signals. These inputs may be dynamically combined based on the use case, avoiding static, bulk-generated context and instead allowing for smarter, situation-aware synthesis.

In at least some embodiments, evaluation agent modularization may be implemented, decoupling evaluation modules to allow modular testing, comparison, and optimization of output quality. This may provide greater flexibility in measuring the performance, latency, and cost of different LLM models and evaluation strategies.

In at least some embodiments, event bus and feedback loop integration may be established, integrating with an event-driven architecture to create a closed feedback loop. This may allow the platform to monitor and analyze inputs and outputs in real time, enabling adaptive learning, quality tracking, and continuous optimization based on system performance.

In at least some embodiments, the PAAIS system 5 may be designed to evolve through a modular architecture that enables the integration of new capabilities as emerging trends and technologies arise. Evaluation agent modularity may allow for interchangeable evaluation components, supporting flexible performance measurement and optimization. Composable context engines may support configurable context modules, such as user signals, domain data, and social trends, that adapt per use case.

In at least some embodiments, self-improving feedback loops may be utilized, leveraging event-driven feedback to iteratively refine outputs based on user engagement and system performance. This approach may ensure that the PAAIS system 5 remains adaptive, scalable, and capable of addressing the evolving needs of users and applications in a rapidly changing technological landscape.

In at least some embodiments, the PAAIS system 5 may address the limitations of models like GPT-4.0 by incorporating historical user data into its processing pipeline, rather than extracting user intent in isolation. While GPT-4.0 can extract user intent and generate constraints for dynamic content generation, it does so without analyzing past interactions, making it less effective for long-term, behavior-driven personalization. In contrast, the PAAIS system 5 may gather and integrate historical data-such as search activity, domain holdings, and published website data-into its structured processing pipeline. This historical data may inform each personalized summary and recommendation, resulting in richer, behavior-driven personalization.

In at least some embodiments, the PAAIS system 5 may analyze and integrate past interactions by collecting data from various sources, including schema, dataset statistics, and task descriptions. The system may use this data to identify important features and summarize the context based on those features using large language models (LLMs). The summarization process may be guided by prompts that require domain knowledge to generate personalized content for the specific use case or task, ensuring that outputs are both relevant and contextually aware.

In at least some embodiments, the PAAIS system 5 may dynamically adapt AI workflows for individual user insights by leveraging individual user data and behavioral context. The system may transform raw user signals-such as purchase history, domain preferences, search behavior, and engagement metrics-into a structured format suitable for LLM processing. It may then identify high-value features relevant to the use case, summarize the user's historical interaction data using guided LLM prompts, and generate personalized insights that reflect the user's intent, preferences, and decision-making patterns, tailored to both the specific task and behavioral history. This enables AI applications to be personalized and customized at run-time for each user according to their preferences.

In at least some embodiments, the PAAIS system 5 may integrate with AWS Bedrock to pre-generate millions of AI-driven summaries at the individual user level, referred to as the shopper level. Each summary may encapsulate an individual customer's behavior and preferences, facilitating efficient, batch-based personalization for large customer datasets and enabling faster, near real-time deployment of AI-generated insights. These insights may include trends, engagement patterns, and recommendation analytics, supporting rapid and scalable delivery of personalized experiences.

In at least some embodiments, the PAAIS system 5 may generate personalized summaries for each customer, market visitor, or customer-venture ID, with "shopper level" broadly including any individual identifier, such as a logged-in shopper, a combination like website plus shopper, or customer plus market. These summaries may capture user-specific data and behavioral patterns, enabling tailored experiences such as personalized product recommendations, preferred domain styles, content for social posts, domain or website generation needs, or targeted marketing campaigns.

In at least some embodiments, by generating this context at the individual level, the PAAIS system 5 may deliver highly relevant experiences that boost engagement, improve conversion rates, and increase overall customer satisfaction. This approach may ensure that each user receives outputs that are not only personalized but also informed by their historical interactions and behavioral trends, setting the PAAIS system 5 apart from traditional, cohort-based or intent-only personalization models.

Figure 5:
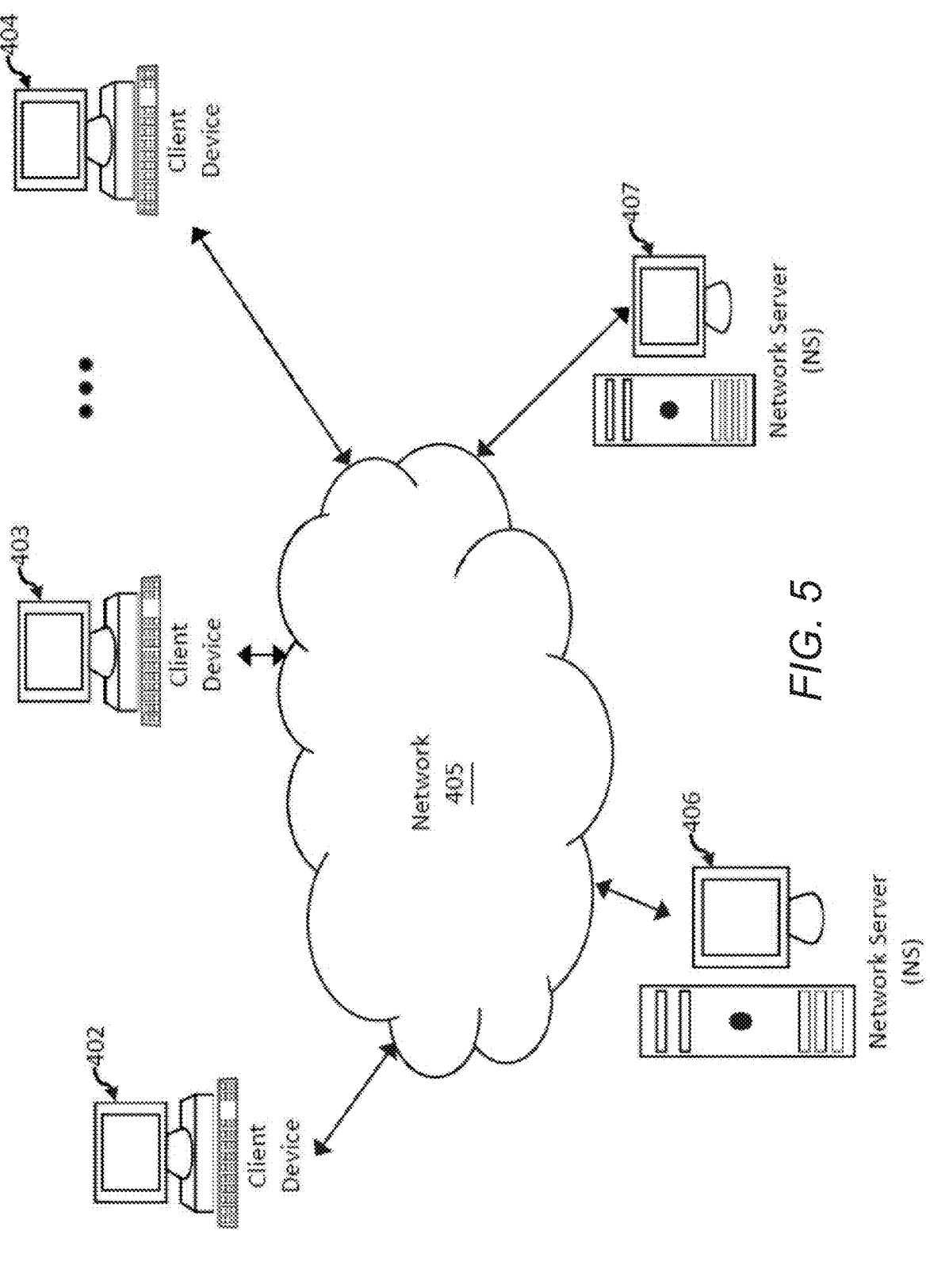
FIG. 5 depicts a block diagram of an exemplary computer-based system/platform in accordance with one or more embodiments of the present disclosure.

FIG. 5 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, the exemplary inventive computing devices and/or the exemplary inventive computing components of the exemplary computer-based system/platform 400 may be configured to perform the functions of the PAAIS system 5, as detailed herein. In at least some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In at least some embodiments, referring to FIG. 5, source devices 402-404 (e.g., client devices) of the exemplary computer-based system/platform 400 may include virtually any computing device capable of receiving and sending a message over a network (e.g., cloud network), such as network 405, to and from another computing device, such as servers 406 and 407, each other, and the like. Here, source devices 402-404 may be the plurality of N source data devices 305A . . . 305N. In at least some embodiments, the source devices 402-404 may be personal computers, multiprocessor systems, microprocessor-based or programmable consumer electronics, network PCs, and the like.

In at least some embodiments, one or more source devices within source devices 402-404 may include computing devices that typically connect using a wireless communications medium such as vehicles, vehicle sensors, cell phones, smart phones, pagers, walkie talkies, radio frequency (RF) devices, infrared (IR) devices, CBs, integrated devices combining one or more of the preceding devices, or virtually any mobile computing device, and the like. In at least some embodiments, one or more source devices within source devices 402-404 may be devices that are capable of connecting using a wired or wireless communication medium such as a PDA, POCKET PC, wearable computer, a laptop, tablet, desktop computer, a netbook, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In at least some embodiments, one or more source devices within source devices 402-404 may include may run one or more applications, such as Internet browsers, mobile applications, voice calls, videoconferencing, and email, among others. In at least some embodiments, one or more source devices within source devices 402-404 may be configured to receive and to send data.

In at least some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In at least some embodiments, a source device within source devices 402-404 may be specifically programmed by either Java, .Net, QT, C, C++ and/or other suitable programming language.

In at least some embodiments, the exemplary network 405 may provide network access, data transport and/or other services to any computing device coupled to it. In at least some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In at least some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE).

In at least some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In at least some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof.

In at least some embodiments, the exemplary network 405 may also include mass storage, such as network attached storage (NAS), a storage area network (SAN), a content delivery network (CDN) or other forms of computer or machine readable media.

In at least some embodiments, the exemplary server 406 or the exemplary server 407 may be a web server (or a series of servers) running a network operating system, examples of which may include but are not limited to Microsoft Windows Server, Novell NetWare, or Linux. In at least some embodiments, the exemplary server 406 or the exemplary server 407 may be used for and/or provide cloud and/or network computing.

In at least some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the source devices 402-404.

In at least some embodiments and, optionally, in combination of any embodiment described above or below, for example, one or more exemplary source devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
FIG. 6 depicts a block diagram of another exemplary computer-based system/platform in accordance with one or more embodiments of the present disclosure.

FIG. 6 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, the source computing devices 502a, 502b thru 502n shown each at least includes a computer-readable medium, such as a random-access memory (RAM) 508 coupled to a processor 510 or FLASH memory. Here, source (e.g., client) devices 502a, 502b thru 502n may be the plurality of N source data devices 305A . . . 305N.

In at least some embodiments, the processor 510 may execute computer-executable program instructions stored in memory 508. In at least some embodiments, the processor 510 may include a microprocessor, an ASIC, and/or a state machine. In at least some embodiments, the processor 510 may include, or may be in communication with, media, for example computer-readable media, which stores instructions that, when executed by the processor 510, may cause the processor 510 to perform one or more steps described herein. In at least some embodiments, examples of computer-readable media may include, but are not limited to, an electronic, optical, magnetic, or other storage or transmission device capable of providing a processor, such as the processor 510 of client 502a, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, source computing devices 502a through 502n may also comprise a number of external or internal devices such as a mouse, a CD-ROM, DVD, a physical or virtual keyboard, a display, a speaker, or other input or output devices. In at least some embodiments, examples of source computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices.

In at least some embodiments, source computing devices 502a through 502n may be specifically programmed with one or more application programs in accordance with one or more principles/methodologies detailed herein. In at least some embodiments, source computing devices 502a through 502n may operate on any operating system capable of supporting a browser or browser-enabled application, such as Microsoft™, Windows™, and/or Linux. In at least some embodiments, source computing devices 502a through 502n shown may include, for example, personal computers executing a browser application program such as Microsoft Corporation's Internet Explorer™, Apple Computer, Inc.'s Safari™, Mozilla Firefox, and/or Opera. In at least some embodiments, through the source computing client devices 502a through 502n, may communicate over the exemplary network 506 with each other and/or with other systems and/or devices coupled to the network 506. As shown in FIG. 6, exemplary server devices 504 and 513 may be also coupled to the network 506. In at least some embodiments, one or more source computing devices 502a through 502n may be mobile clients.

In at least some embodiments, at least one database of exemplary databases 507 and 515 may be any type of database, such as the database 362 described above, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

Figure 7:
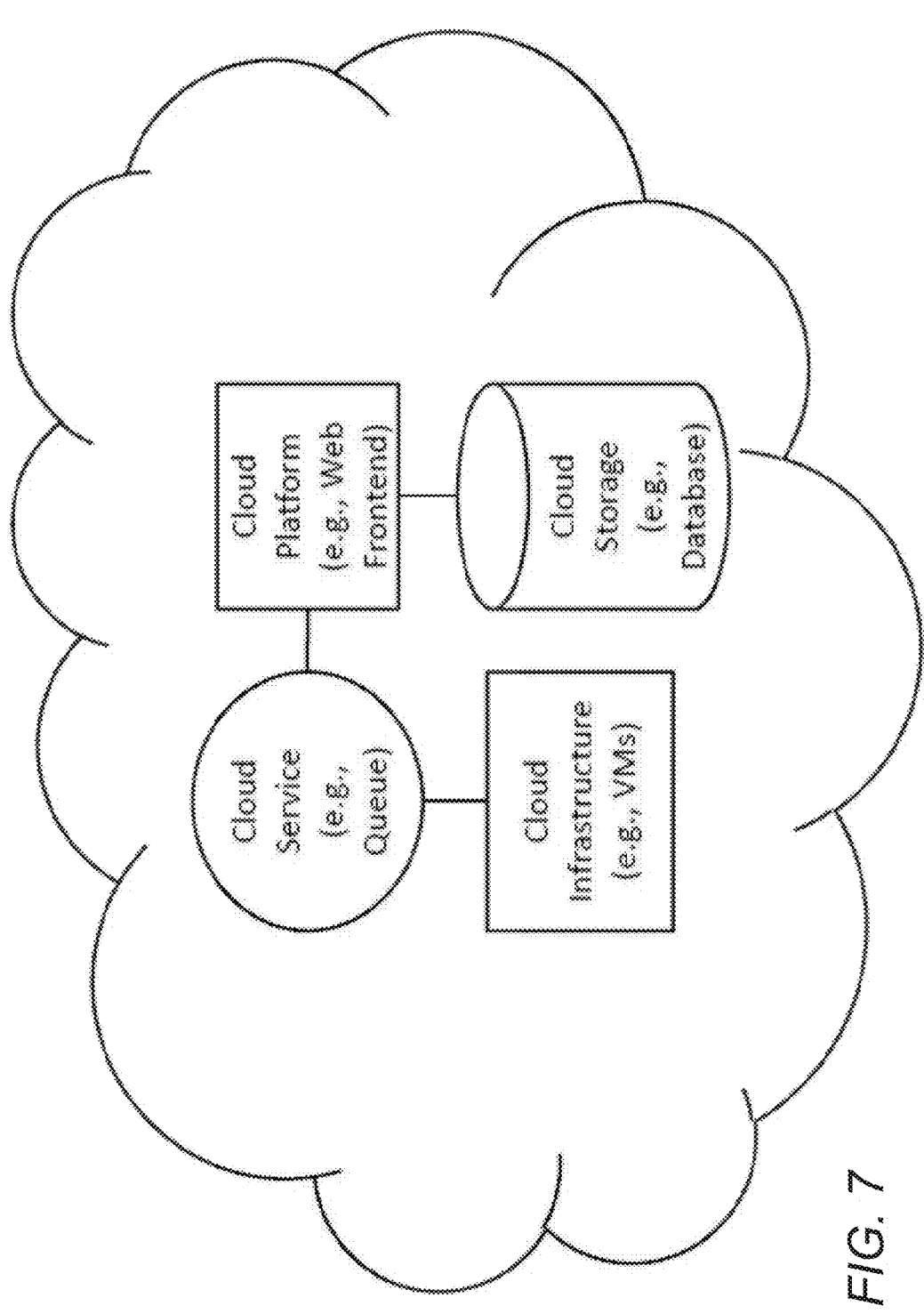
FIGS. 7 and 8 are diagrams illustrating implementations of cloud computing architecture/aspects with respect to which the disclosed technology may be specifically configured to operate, in accordance with one or more embodiments of the present disclosure.
Figure 8:
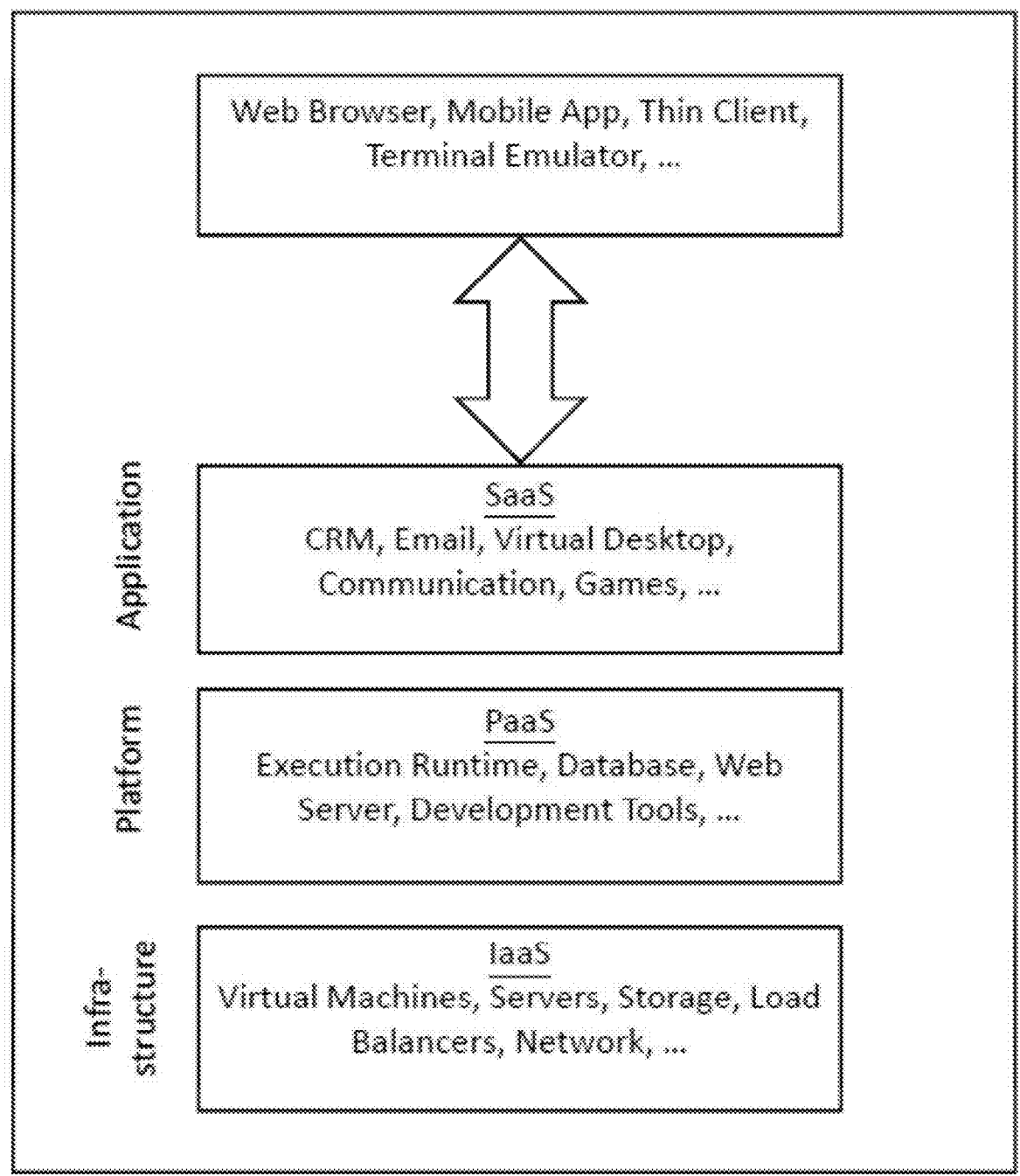

In at least some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 9:
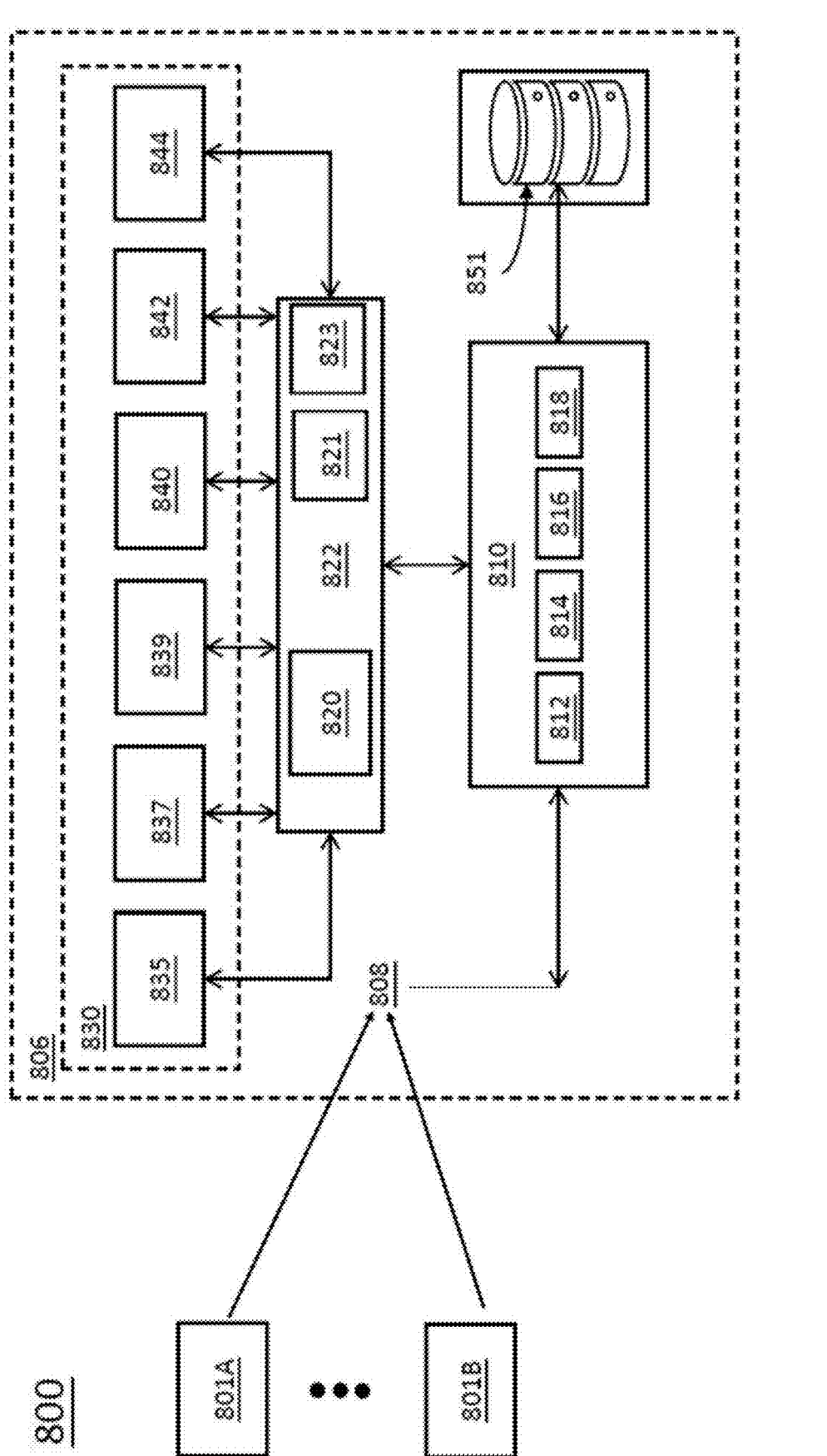
FIG. 9 is a block diagram of a system for generating user-specific outputs using modular AI agents and hybrid data representation engines based on a Personalized Agentic AI Service (PAAIS) microservices platform in accordance with one or more embodiments of the present disclosure.

FIG. 9 is a block diagram of a system 800 for generating user-specific outputs using modular AI agents and hybrid data representation engines based on a Personalized Agentic AI Service (PAAIS) microservices platform 806 in accordance with one or more embodiments of the present disclosure. Aspects of the present disclosure may be applied to any embodiment for the microservices platform 206 that may include software modules denoted 835, 837, 839, 840 and 844 for implementing the PAAIS microservices in a service layer 830 as described hereinbelow. The software modules 835, 837, 839, 840 and 844 may be for example, a feature selection agent, a numerical transformation agent, a summarization agent, a hybrid data representation engine (hybrid summarization engine), and/or a control plane module.

In at least some embodiments, the PAAIS microservices platform 806 may include a multi-layered architecture including, for example, the service layer 830, an orchestration layer 822, and a platform layer 810, however other layers may be additionally contemplated. In some embodiments, a plurality of data sources may interact with the PAAIS microservices platform 806 via any of a plurality of N external entities and/or applications, where N may be an integer. Communications from the plurality of external entities and/or applications denoted 801A . . . 801B may be received by a communication circuitry 808 and may then be routed to an appropriate component of the system, via the platform layer 810, for example.

In at least some embodiments, the plurality of N external entities and/or applications may include, for example, caller (external entity or application that sends requests to the system via an API), downstream systems (external systems that consume outputs via API), Consumers (external systems or applications that retrieve user-specific data outputs), External platforms (e.g., Facebook, Instagram, Google Analytics, referenced as data sources), and/or entities interacting with the system through API endpoints.

In at least some embodiments, the platform layer 810 may include an input/output (I/O) interface 812 for facilitating data communication to external devices, such as, e.g., the communication circuitry 808 with any other system devices. The platform layer 810 may also include a runtime environment 814 for implementing programs, services, functionalities and microservices using a plurality of processors 816 and memory devices 818 in a plurality of computing machines such as the M computing machines 8 for implementing the PAAIS microservices platform 806. The memory devices 818 may include, e.g., temporary storage and caching of data to facilitate resources of the PAAIS microservices platform 806.

In at least some embodiments, the orchestrator 820 may manage operations of the PAAIS microservices platform 206, including allocation of resources (e.g., add or removing any number of the computing machines) by a load balancer 823, process schedule with, e.g., the plurality of processors 816, among other tasks. For example, in some embodiments, the orchestrator 820 may include a plurality of application programming interfaces (APIs) 821 for calling services and functions of the PAAIS microservices platform 806 in interacting with the plurality of external entities and/or applications 801A . . . 801B.

In at least some embodiments, the orchestrator 820 may manage operations of microservices in a service layer 830 and coordination of the service layer 830 with the platform layer 810. For example, the service layer 830 may include software modules 835, 837, 839, 840 and 844 related to, for example, implementing the PAAIS microservices platform for generating user-specific outputs using modular AI agents and hybrid data representation engines based on the PAAIS microservices platform 806. In some embodiments, the orchestrator 820 may facilitate aggregation of data from multiple domains in the service layer 830 and/or may orchestrate data-related operations across domains and services to provide for complete experiences within any given domain.

In at least some embodiments, the database 851 as described above may be separate from databases stored in the plurality of memories stored in the plurality of computing machines.

In at least some embodiments, any data stored the plurality of databases may be accessible from the plurality of N external entities and/or applications denoted 801A . . . 801B via any of the plurality of APIs 821 in the orchestration layer 222 in the PAAIS microservices platform 806.

FIG. 10 is a flowchart of a method 900 for generating user-specific outputs using modular AI agents and hybrid data representation engines in accordance with one or more embodiments of the present disclosure. The method may be performed by at least one processor such as from the plurality of processors 816, for example.

In some embodiments, the method 900 may include receiving 910, by at least one processor, a plurality of user data inputs and activity configuration data from a plurality of data sources, wherein the activity configuration data specifies at least one user-specific activity for at least one user.

In some embodiments, the method 900 may include processing 920, by the at least one processor, the plurality of user data inputs and the activity configuration data to generate raw input data for the at least one user-specific activity.

In some embodiments, the method 900 may include transmitting 930, by the at least one processor, the raw input data and the activity configuration data to a control plane module configured to determine processing parameters for a plurality of modular AI agents, wherein the processing parameters are based on the activity configuration data.

In some embodiments, the method 900 may include using 940, by the at least one processor, the plurality of modular AI agents to: activate a first agent from the plurality of modular AI agents to extract at least one user interaction feature from the raw input data, activate a second agent from the plurality of modular AI agents to convert numerical values within the raw input data into a text format; and activate a third agent from the plurality of modular AI agents to generate a data representation with activity-specific information based on the at least one user interaction feature and the numerical values converted to the text format.

In some embodiments, the method 900 may include generating 950, by the at least one processor, using the third agent and a hybrid data representation engine, at least one user-specific activity-specific data output from the data representation based on the activity configuration data.

In some embodiments, the method 900 may include evaluating 960, by the at least one processor, using the third agent and a large language model, the at least one user-specific activity-specific data output based on at least one evaluative criterion.

In some embodiments, the method 900 may include storing 970, by the at least one processor, the at least one user-specific activity-specific data output in a persistent storage layer.

In some embodiments, the method 900 may include providing 980, by the at least one processor, the at least one user-specific activity-specific data output via an application programming interface (API) for subsequent use by downstream systems, wherein the API facilitates an interaction with a plurality of external entities.

In at least some embodiments, a method may include receiving, by at least one processor, a plurality of user data inputs and activity configuration data from a plurality of data sources, where the activity configuration data specifies at least one user-specific activity for at least one user. The method may further include processing, by the at least one processor, the plurality of user data inputs and the activity configuration data to generate raw input data for the at least one user-specific activity. The method may include transmitting, by the at least one processor, the raw input data and the activity configuration data to a control plane module configured to determine processing parameters for a plurality of modular AI agents, where the processing parameters are based on the activity configuration data. The method may include using, by the at least one processor, the plurality of modular AI agents to activate a first agent from the plurality of modular AI agents to extract at least one user interaction feature from the raw input data, activate a second agent from the plurality of modular AI agents to convert numerical values within the raw input data into a text format, and activate a third agent from the plurality of modular AI agents to generate a data representation with activity-specific information based on the at least one user interaction feature and the numerical values converted to the text format. The method may further include generating, by the at least one processor, using the third agent and a hybrid data representation engine, at least one user-specific activity-specific data output from the data representation based on the activity configuration data.

In at least some embodiments, the method may include evaluating, by the at least one processor, using the third agent and a large language model, the at least one user-specific activity-specific data output based on at least one evaluative criterion. The method may include storing, by the at least one processor, the at least one user-specific activity-specific data output in a persistent storage layer, and providing, by the at least one processor, the at least one user-specific activity-specific data output via an application programming interface (API) for subsequent use by downstream systems, where the API facilitates an interaction with a plurality of external entities.

In at least some embodiments, the first agent may be a feature selection agent, the second agent may be a numerical transformation agent, the third agent may be a summarization agent, and the hybrid data representation engine may be a hybrid summarization engine.

In at least some embodiments, the feature selection agent may extract the at least one user interaction feature using machine learning models, statistical algorithms, or both.

In at least some embodiments, the numerical transformation agent may convert the numerical values into the text format using predefined templates, algorithmic transformations, or both.

In at least some embodiments, the at least one evaluative criterion may include at least one of: a contextual relevance criterion, a factual accuracy criterion, an alignment criterion with the at least one user-specific activity, or any combination thereof.

In at least some embodiments, the plurality of user data inputs may include interaction logs, transaction records, sensor data, unstructured text data, or any combination thereof.

In at least some embodiments, the activity configuration data may include operational constraints, data processing rules, or output formatting requirements.

In at least some embodiments, the hybrid data representation engine may combine extractive techniques, including keyword identification and ranking, with abstractive techniques, including text generation and paraphrasing.

In at least some embodiments, the persistent storage layer may index the at least one user-specific activity-specific data output for data integrity.

In at least some embodiments, the API may facilitate batch processing, real-time requests, caching mechanisms, or any combination thereof, to optimize response times for frequently accessed outputs.

In at least some embodiments, a system may include at least one processor and a memory coupled to the at least one processor, the memory storing instructions that, when executed by the at least one processor, cause the system to receive a plurality of user data inputs and activity configuration data from a plurality of data sources, where the activity configuration data specifies at least one user-specific activity for at least one user. The system may process the plurality of user data inputs and the activity configuration data to generate raw input data for the at least one user-specific activity, transmit the raw input data and the activity configuration data to a control plane module configured to determine processing parameters for a plurality of modular AI agents, where the processing parameters are based on the activity configuration data, and use the plurality of modular AI agents to activate a first agent from the plurality of modular AI agents to extract at least one user interaction feature from the raw input data, activate a second agent from the plurality of modular AI agents to convert numerical values within the raw input data into a text format, and activate a third agent from the plurality of modular AI agents to generate a data representation with activity-specific information based on the at least one user interaction feature and the numerical values converted to the text format. The system may generate, using the third agent and a hybrid data representation engine, at least one user-specific activity-specific data output from the data representation based on the activity configuration data, evaluate, using the third agent and a large language model, the at least one user-specific activity-specific data output based on at least one evaluative criterion, store the at least one user-specific activity-specific data output in a persistent storage layer, and provide the at least one user-specific activity-specific data output via an application programming interface (API) for subsequent use by downstream systems, where the API facilitates an interaction with a plurality of external entities.

In at least some embodiments, the first agent may be a feature selection agent, the second agent may be a numerical transformation agent, the third agent may be a summarization agent, and the hybrid data representation engine may be a hybrid summarization engine.

In at least some embodiments, the feature selection agent may extract the at least one user interaction feature using machine learning models, statistical algorithms, or both.

In at least some embodiments, the numerical transformation agent may convert the numerical values into the text format using predefined templates, algorithmic transformations, or both.

In at least some embodiments, the at least one evaluative criterion may include at least one of: a contextual relevance criterion, a factual accuracy criterion, an alignment criterion with the at least one user-specific activity, or any combination thereof.

In at least some embodiments, the plurality of user data inputs may include interaction logs, transaction records, sensor data, unstructured text data, or any combination thereof.

In at least some embodiments, the activity configuration data may include operational constraints, data processing rules, or output formatting requirements.

In at least some embodiments, the hybrid data representation engine may combine extractive techniques, including keyword identification and ranking, with abstractive techniques, including text generation and paraphrasing.

In at least some embodiments, the persistent storage layer may index the at least one user-specific activity-specific data output for data integrity.

In at least some embodiments, the API may facilitate batch processing, real-time requests, caching mechanisms, or any combination thereof, to optimize response times for frequently accessed outputs.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:

receiving, by at least one processor, a plurality of user data inputs and activity configuration data from a plurality of data sources, wherein the activity configuration data specifies at least one user-specific activity for at least one user;

processing, by the at least one processor, the plurality of user data inputs and the activity configuration data to generate input data for the at least one user-specific activity;

transmitting, by the at least one processor, the input data and the activity configuration data to a control plane module, wherein the control plane module is configured to determine processing parameters for a plurality of modular AI agents, and the processing parameters are based on the activity configuration data;

using, by the at least one processor, the plurality of modular AI agents to:

activate a first agent from the plurality of modular AI agents to extract at least one user interaction feature from the input data;

activate a second agent from the plurality of modular AI agents to convert numerical values within the input data into a text format; and activate a third agent from the plurality of modular AI agents to generate a data representation with activity-specific information, wherein the generation of the data representation is based on the at least one user interaction feature and the numerical values converted to the text format;

generating, by the at least one processor, using the third agent and a hybrid data representation engine, at least one user-specific activity-specific data output from the data representation based on the activity configuration data;

evaluating, by the at least one processor, using the third agent and a large language model, the at least one user-specific activity-specific data output based on at least one evaluative criterion;

storing, by the at least one processor, the at least one user-specific activity-specific data output in a persistent storage layer; and providing, by the at least one processor, the at least one user-specific activity-specific data output via an application programming interface (API) for subsequent use by downstream systems, wherein the API controls an interaction with a plurality of external entities.

2. The method of claim 1, wherein the first agent is a feature selection agent;

wherein the second agent is a numerical transformation agent;

wherein the third agent is a summarization agent; and wherein the hybrid data representation engine is a hybrid summarization engine.

3. The method of claim 2, wherein the feature selection agent extracts the at least one user interaction feature from the input data using at least one of machine learning models or statistical algorithms.

4. The method of claim 2, wherein the numerical transformation agent converts the numerical values within the input data into the text format using at least one of predefined templates or algorithmic transformations.

5. The method of claim 1, wherein the at least one evaluative criterion comprises at least one of: a contextual relevance criterion, a factual accuracy criterion, or an alignment criterion with the at least one user-specific activity.

6. The method of claim 1, wherein the plurality of user data inputs comprises at least one of interaction logs, transaction records, sensor data, or unstructured text data.

7. The method of claim 1, wherein the activity configuration data includes operational constraints, data processing rules, or output formatting requirements.

8. The method of claim 1, wherein the hybrid data representation engine combines extractive techniques, comprising keyword identification and ranking, with abstractive techniques, comprising text generation and paraphrasing.

9. The method of claim 1, wherein the persistent storage layer indexes the at least one user-specific activity-specific data output for data integrity.

10. The method of claim 1, wherein the API further controls at least one of batch processing, real-time requests, or caching mechanisms, to optimize response times for frequently accessed outputs.

11. A system, comprising:

at least one processor;

a memory coupled to the at least one processor, the memory storing instructions that, when executed by the at least one processor, cause the system to:

receive a plurality of user data inputs and activity configuration data from a plurality of data sources, wherein the activity configuration data specifies at least one user-specific activity for at least one user;

process the plurality of user data inputs and the activity configuration data to generate input data for the at least one user-specific activity;

transmit the input data and the activity configuration data to a control plane module, wherein the control plane module is configured to determine processing parameters for a plurality of modular AI agents, and the processing parameters are based on the activity configuration data;

use the plurality of modular AI agents to:

activate a first agent from the plurality of modular AI agents to extract at least one user interaction feature from the input data, activate a second agent from the plurality of modular AI agents to convert numerical values within the input data into a text format, and activate a third agent from the plurality of modular AI agents to generate a data representation with activity-specific information, wherein the generation of the data representation is based on the at least one user interaction feature and the numerical values converted to the text format;

generate, using the third agent and a hybrid data representation engine, at least one user-specific activity-specific data output from the data representation based on the activity configuration data;

evaluate, using the third agent and a large language model, the at least one user-specific activity-specific data output based on at least one evaluative criterion;

store the at least one user-specific activity-specific data output in a persistent storage layer; and provide the at least one user-specific activity-specific data output via an application programming interface (API) for subsequent use by downstream systems, wherein the API controls an interaction with a plurality of external entities.

12. The system of claim 11, wherein the first agent is a feature selection agent;

wherein the second agent is a numerical transformation agent;

wherein the third agent is a summarization agent; and wherein the hybrid data representation engine is a hybrid summarization engine.

13. The system of claim 12, wherein the feature selection agent extracts the at least one user interaction feature from the input data using at least one of machine learning models or statistical algorithms.

14. The system of claim 12, wherein the numerical transformation agent converts the numerical values within the input data into the text format using at least one of predefined templates or algorithmic transformations.

15. The system of claim 11, wherein the at least one evaluative criterion comprises at least one of: a contextual relevance criterion, a factual accuracy criterion, or an alignment criterion with the at least one user-specific activity.

16. The system of claim 11, wherein the plurality of user data inputs comprises interaction logs, transaction records, sensor data, or unstructured text data.

17. The system of claim 11, wherein the activity configuration data includes operational constraints, data processing rules, or output formatting requirements.

18. The system of claim 11, wherein the hybrid data representation engine combines extractive techniques, comprising keyword identification and ranking, with abstractive techniques, comprising text generation and paraphrasing.

19. The system of claim 11, wherein the persistent storage layer indexes the at least one user-specific activity-specific data output for data integrity.

20. The system of claim 11, wherein the API further controls at least one of batch processing, real-time requests, or caching mechanisms, to optimize response times for frequently accessed outputs.

* * * * *